(No Model.) 3 Sheets—Sheet 1.
E. C. FULCHER.
HARVESTER KNOTTER.
No. 468,244. Patented Feb. 2, 1892.
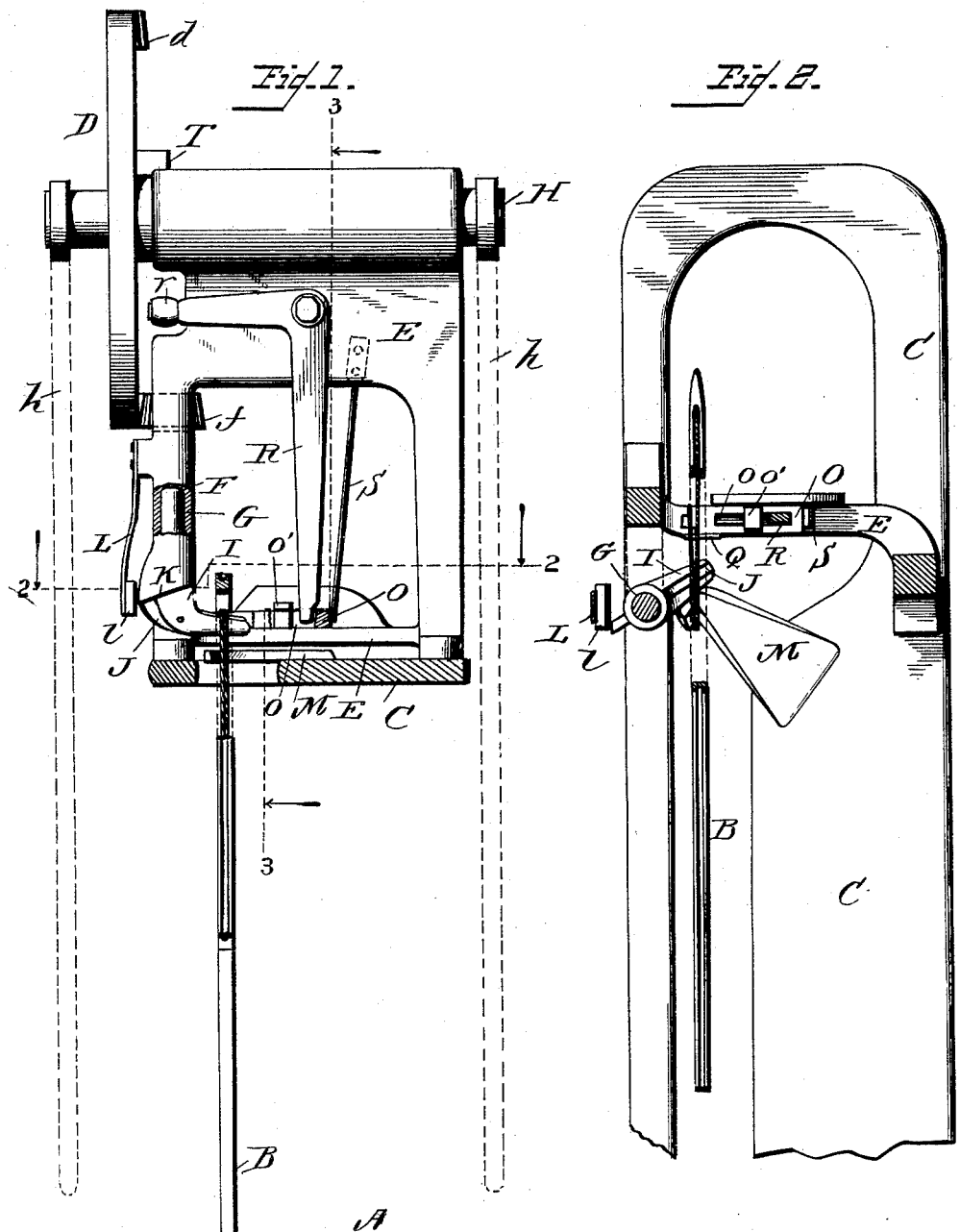
Witnesses
Inventor
Edwin C. Fulcher.
By his Attorneys (No Model.) 3 Sheets—Sheet 2.
E. C. FULCHER.
HARVESTER KNOTTER.
No. 468,244. Patented Feb. 2, 1892.
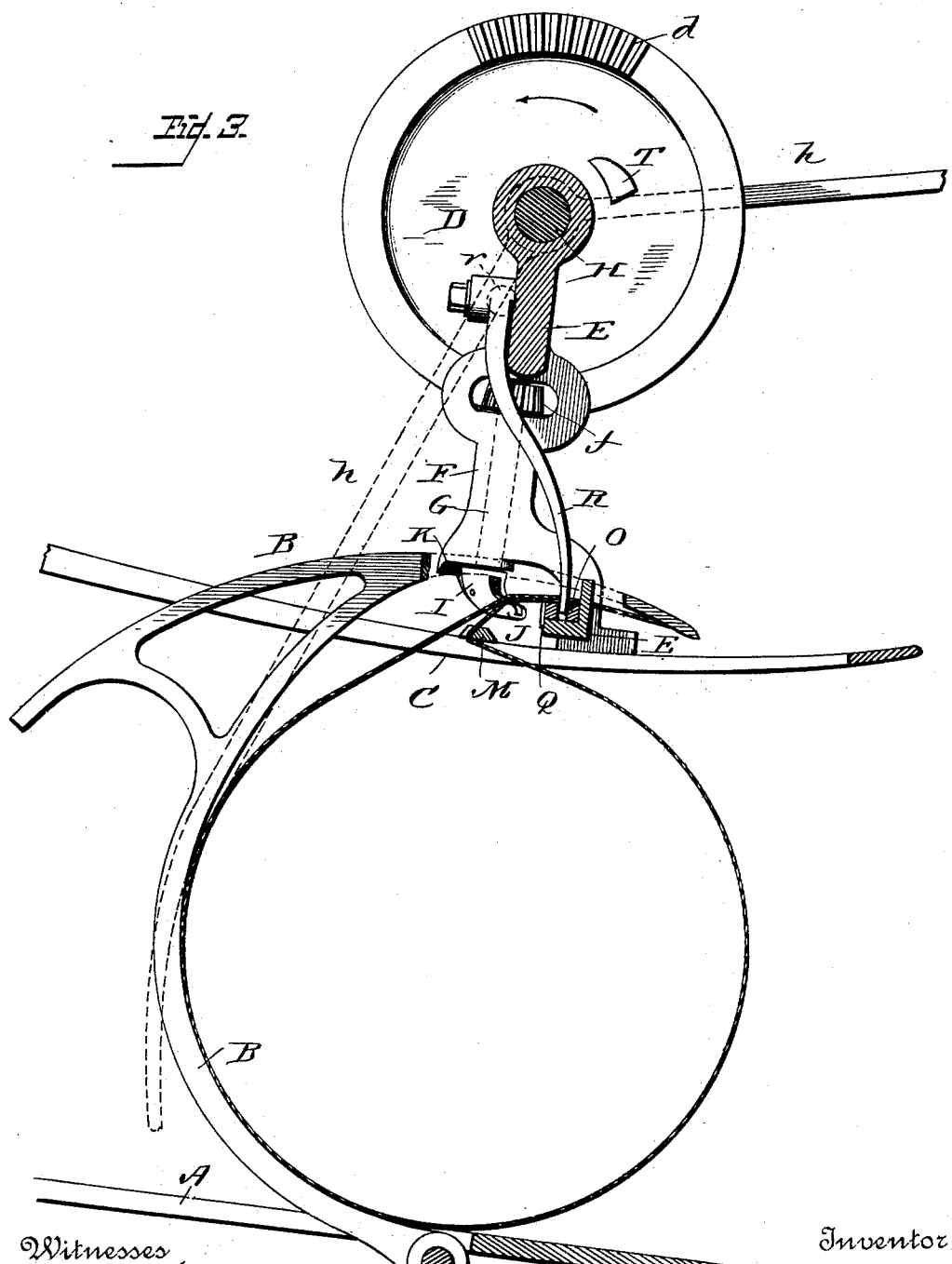

(No Model.) 3 Sheets—Sheet 3.
E. C. FULCHER.
HARVESTER KNOTTER.
No. 468,244. Patented Feb. 2, 1892.
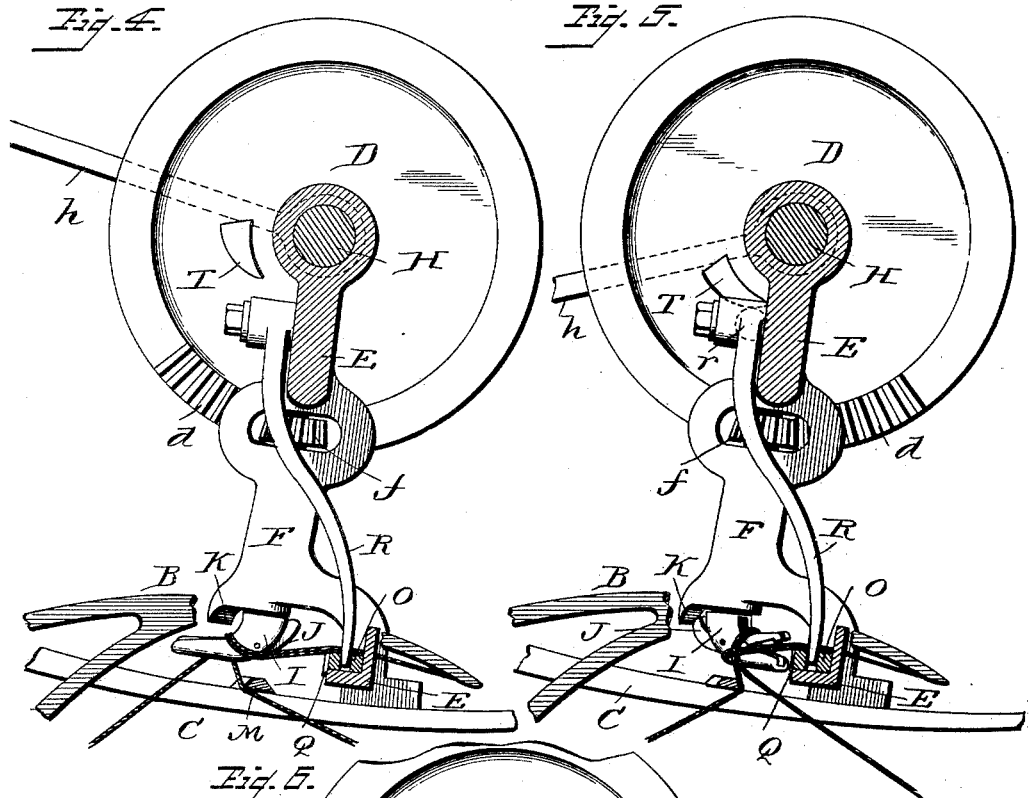
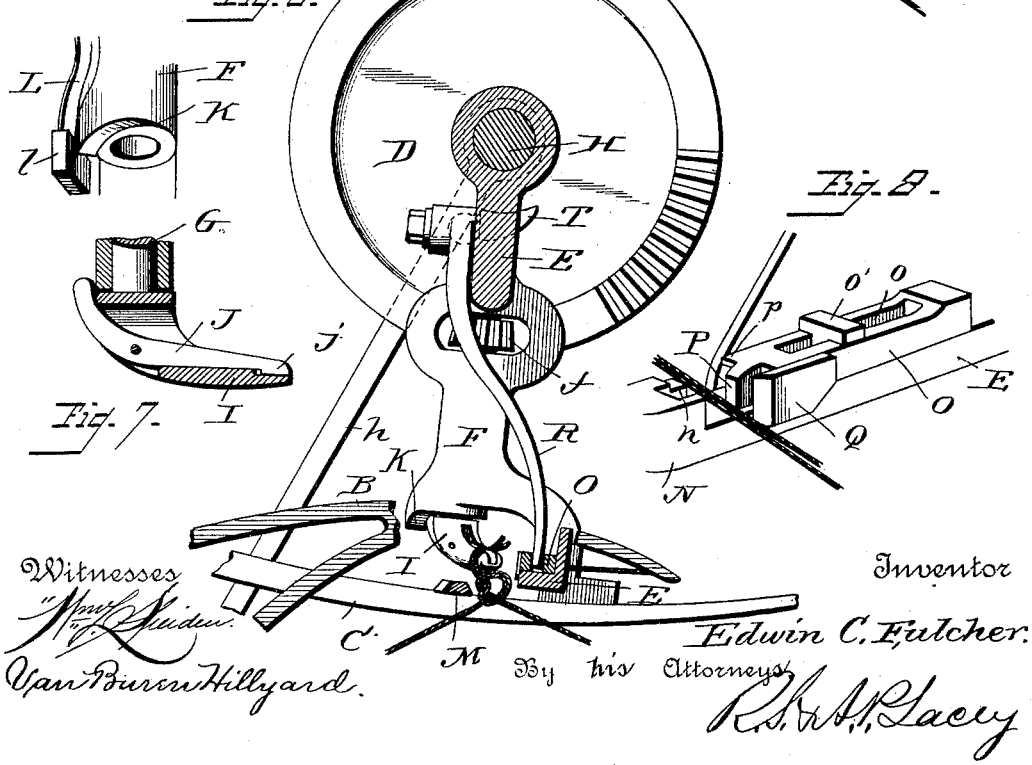
Witnesses
Inventor
Edwin C. Fulcher.
By his Attorneys

UNITED STATES PATENT OFFICE.

EDWIN C. FULCHER, OF STAUNTON, VIRGINIA.

HARVESTER-KNOTTER.

SPECIFICATION forming part of Letters Patent No. 468,244, dated February 2, 1892.

Application filed March 10, 1891. Serial No. 384,452. (No model.)

*To all whom it may concern:*

Be it known that I, EDWIN C. FULCHER, a citizen of the United States, residing at Staunton, in the county of Augusta and State of Virginia, have invented certain new and useful Improvements in Harvester-Knotters; and I do hereby declare the following to be a full, clear, and exact description of the invention, such as will enable others skilled in the art to which it appertains to make and use the same.

This invention relates to harvester-knotter mechanism and aims to provide simple contrivances for effectively and conveniently tying together the cord after the same has been passed around the bundle, cutting the cord and retaining the severed end, and ejecting the bundle.

The improvement consists of the novel instrumentalities and the peculiar combination of the parts, which will be hereinafter more fully described and claimed, and which are shown in the annexed drawings, in which—

Figure 1 is a front elevation of the invention, the throat-plate being in section and parts being broken away, showing the relative arrangement of the parts. Fig. 2 is a horizontal section about on the line 2 2 of Fig. 1, the needle and the throat-plate being broken away. Fig. 3 is a vertical section on the line 3 3 of Fig. 1, parts being broken away. Fig. 4 is a detail view of the knotter mechanism, showing the relative arrangement of the parts when the teeth on the drive-wheel begin to mesh with the pinion on the knotter-shaft in the process of knotting the cord. Fig. 5 is a detail view showing the disposition of the parts when the said teeth on the drive-wheel are about to be disengaged from the said pinion, showing the movable jaw of the knotter in the act of grasping the cord prior to the operation of the cord cutting and clamping mechanism. Fig. 6 shows the relative location of the parts after the cord has been severed and the ejectors are about to discharge the bundle. Fig. 7 is a detail view of the knotter and the lower end of the tubular standard in which the knotter-shaft is journaled. Fig. 8 is a detail view of the cord cutting and clamping mechanism.

The grain-platform A, the needle B, the throat-plate C, and the knotter-actuating or drive-wheel D are of ordinary construction and relative arrangement.

The bearing E, projected up from and secured to the throat-plate C, is provided with the tubular standard F, in which the knotter-shaft G is journaled. The horizontal shaft H, to which the drive-wheel D is secured, is journaled in the bearing E and is provided at its ends with the ejector-arms $h$. The pinion $f$ at the upper end of the knotter-shaft G is adapted to be engaged by the teeth $d$ on the inner side of the drive-wheel D. The knotter-bill I at the lower end of the shaft G is apertured or slotted to receive the jaw J, which is thrust through the slot and pivoted therein between its ends. The rear end of the jaw J curves up and projects beyond the knotter-bill and the side of the tubular standard. The front end of the jaw J is provided with a hook $j$, which enters a corresponding depression in the knotter-bill, and the latter is recessed in its upper side to receive the said front portion of the jaw J. The cam K at the side of and near the lower end of the tubular standard is provided to engage with the end of the jaw J and open the same at the proper time. The presser-block $l$ at the end of the spring L, which is secured to the tubular standard F, engages with the curved end of the jaw J and closes the same on the cord at the proper moment. The detent-plate M, secured to the throat-plate and projecting across the slot therein, is hooked at its outer end and engages with the cord and retains the same within the path of the knotter and prevents it slipping off the knotter-bill during the initial rotation of the said knotter-bill in the process of tying the knot.

The cord cutter and clamp is composed of two parts—the stationary jaw N and the movable jaw O, the latter being slotted at $o$ and held to a portion of the bearing E by the headed fastening $o'$. The fixed jaw N has a depression $n$, and the movable jaw O has a corresponding tongue P to enter the depression $n$ and clamp the cord. The knife Q, secured to the movable jaw O, works in opposition to the end of the fixed jaw and severs the cord. The lip $p$ on the movable jaw overlaps a portion of the fixed jaw and prevents the cord from being withdrawn from between the jaws in a vertical direction when the needle is returning to a normal position below the platform after the bound bundle has been ejected.

The bell-crank lever R is pivoted at its elbow to the bearing E, and its vertical branch engages with the movable jaw O, and its horizontal member extends within the path of a cam T on the drive-wheel D, to be operated thereby to move the jaw O back. The spring S closes the jaw O and retains it in a position to clamp the severed end of the cord. The roller r on the horizontal member of the lever R relieves the friction between the said lever and the cam T.

The drive-wheel D is operated from any convenient part of the harvester-driving mechanism in any well-known manner, and the grain is packed and the needle actuated in the usual way. Fig. 3 shows the position of the needle after the cord has been passed around the bundle, the dotted lines showing the position of the ejector-arms h prior to their contact with the bundle. The cord extends over the knotter-bill. When the teeth d begin to engage with the pinion f and the knotter-shaft is partially turned, the cord assumes the position shown in Fig. 4. As the knotter-shaft is approaching the end of a complete revolution the curved end of the jaw J will ride upon the cam K and effect an opening of the jaw J. (See Fig. 5.) The instant the jaw is released from the cam K the curved end is pressed upon by the block l, which closes the jaw on the cord and clamps the same. At this stage of the operation the knotter-shaft has made one complete revolution. The cam T now engages with the elbow-lever and through it moves the jaw O back with a flirt, the spring S quickly returning the said jaw to a normal position and effecting a severance of the cord by means of the knife Q, the severed end being held fast between the jaws N and O. The loop slips from the knotter-bill and the severed ends of the cord are drawn through the said loop, as clearly shown in Fig. 6. The ejectors h engage with the bundle and throw it off the machine. The ends of the cord are dragged from between the jaw and the bill of the knotter and the knot tightened.

Having thus described my invention, what I claim, and desire to secure by Letters Patent, is—

In a harvester-knotter mechanism, the combination of the actuating-wheel D, having cam T, the bell-crank lever R, adapted to be operated by the said cam T, the cord cutter and clamp comprising jaw N, having recess n, and the slotted jaw O, having tongue P, lip p, and knife Q, the headed fastening o', passing through the slot in the said jaw and retaining it in place, and the spring S, having its lower end pressing against the jaw O to close the same after the lever R has been released from the action of the cam T, substantially as and for the purpose described.

In testimony whereof I affix my signature in presence of two witnesses.

EDWIN C. FULCHER.

Witnesses:
 T. R. N. SPECK,
 E S. SUBLETT.